United States Patent
Shigetomi et al.

(10) Patent No.: US 6,938,121 B2
(45) Date of Patent: Aug. 30, 2005

(54) DISK STORAGE SYSTEM HAVING AN ELECTRONIC CIRCUIT MOUNTED ON THE SURFACE OF THE DISK AND CONTROL METHOD THEREOF

(75) Inventors: Takashi Shigetomi, Miyagi-ken (JP); Tetsuo Saito, Miyagi-ken (JP); Tsunematsu Komaki, Tokyo (JP)

(73) Assignee: Kabushiki Kaisha Optrom, Miyagiken (JP)

( * ) Notice: Subject to any disclaimer, the term of this patent is extended or adjusted under 35 U.S.C. 154(b) by 0 days.

(21) Appl. No.: 10/820,073

(22) Filed: Apr. 6, 2004

(65) Prior Publication Data

US 2004/0193793 A1 Sep. 30, 2004

Related U.S. Application Data

(63) Continuation of application No. 09/837,348, filed on Apr. 18, 2001, now abandoned, which is a continuation of application No. 09/155,785, filed as application No. PCT/JP98/02700 on Oct. 2, 1998, now abandoned.

(30) Foreign Application Priority Data

Jun. 18, 1997 (JP) .............................................. 9-161667

(51) Int. Cl.[7] .............................................. G06F 12/00
(52) U.S. Cl. ......................... 711/112; 711/115; 369/14; 369/15; 369/18
(58) Field of Search ................................ 711/112, 115; 369/14, 15, 18

(56) References Cited

U.S. PATENT DOCUMENTS

| | | | |
|---|---|---|---|
| 4,338,644 A | 7/1982 | Staar | |
| 4,839,875 A | 6/1989 | Kuriyama et al. | |

(Continued)

FOREIGN PATENT DOCUMENTS

| | | |
|---|---|---|
| DE | 196 07 169 | 11/1996 |
| EP | 0 190 733 | 8/1986 |

(Continued)

OTHER PUBLICATIONS

"Magnetic Recording Disk with Silicon Substrate Disk Containing Both Integrated Electronic Circuits and Magnetic Media" IBM Technical Disclosure Bulletin, vol. 28, No. 7, Dec. 1985, pp. 2861–2862, XP002073271 New York, US.
IBM Journal TDB, Jun. 1992, pp. 31–314.
Patent Abstract of Japan vol. 012, No. 140 (P–696), Apr. 28, 1988 for JP 62–262289A, Nov. 14, 1987.
Patent Abstract of Japan vol. 097, No. 005, May 30, 1997 & JP 09–017154A, Jan. 17, 1997.
Patent Abstract of Japan (JPA 09–245381).
Patent Abstract of Japan vol. 033 (P–334), Feb. 13, 1985 & JP59–175062A, Oct. 3, 1984.

*Primary Examiner*—Mano Padmanabhan
*Assistant Examiner*—Mehdi Namazi
(74) *Attorney, Agent, or Firm*—Merchant & Gould P.C.

(57) ABSTRACT

The present invention provides a control method of a rotary storage medium having an electronic circuit that controls connection between an electronic circuit block and an external apparatus to enhance the performance of the entire system, and a system thereof. The system is an intelligent disk system including an intelligent disk having double-surface structure that stores information and is detachable from a drive unit, wherein an electronic circuit is mounted on at least one surface or between both surfaces of the intelligent disk and the electronic circuit is provided with a CPU, and wherein the system controls the intelligent disk so that contents of the disk surfaces of the intelligent disk may be transferred to or loaded in an external apparatus at the time of the intelligent disk rotating or mechanically operating (S36–S37) and the CPU may control the external apparatus when the intelligent disk is not operating.

6 Claims, 5 Drawing Sheets

U.S. PATENT DOCUMENTS

| | | | |
|---|---|---|---|
| 4,960,982 A | 10/1990 | Takahira | |
| 5,036,461 A | 7/1991 | Elliott et al. | |
| 5,119,353 A | 6/1992 | Asakura | |
| 5,159,182 A | 10/1992 | Eisele | |
| 5,235,586 A * | 8/1993 | Feamster et al. | 369/100 |
| 5,276,572 A | 1/1994 | Kinoshita et al. | |
| 5,289,521 A | 2/1994 | Coleman et al. | |
| 5,423,054 A | 6/1995 | Schmidt et al. | |
| 5,533,125 A | 7/1996 | Bensimon et al. | |
| 5,546,585 A | 8/1996 | Soga | |
| 5,559,927 A | 9/1996 | Clynes | |
| 5,559,958 A | 9/1996 | Farrand et al. | |
| 5,584,043 A | 12/1996 | Burkart | |
| 5,634,111 A | 5/1997 | Oeda et al. | |
| 5,652,838 A | 7/1997 | Lovett et al. | |
| 5,663,553 A | 9/1997 | Aucsmith | |
| 5,734,787 A | 3/1998 | Yonemitsu et al. | |
| 5,737,549 A | 4/1998 | Hersch et al. | |
| RE35,839 E | 7/1998 | Asai et al. | |
| 5,793,714 A | 8/1998 | Inoue et al. | |
| 5,802,519 A | 9/1998 | De Jong | |
| 5,844,218 A | 12/1998 | Kawan et al. | |
| 5,856,659 A | 1/1999 | Drupsteen et al. | |
| 5,857,079 A | 1/1999 | Claus et al. | |
| 5,878,282 A | 3/1999 | Mital | |
| 5,889,657 A | 3/1999 | Kono | |
| 5,890,014 A | 3/1999 | Long | |
| 5,903,867 A | 5/1999 | Watari et al. | |
| 5,920,733 A | 7/1999 | Rao | |
| 5,930,823 A | 7/1999 | Ito et al. | |
| 5,936,226 A | 8/1999 | Aucsmith | |
| 5,951,687 A | 9/1999 | Chan et al. | |
| 5,999,698 A | 12/1999 | Nakai et al. | |
| 6,005,940 A | 12/1999 | Kulinets | |
| 6,021,306 A | 2/2000 | McTaggart | |
| 6,029,887 A | 2/2000 | Furuhashi et al. | |
| 6,044,046 A * | 3/2000 | Diezmann et al. | 369/14 |

FOREIGN PATENT DOCUMENTS

| | | |
|---|---|---|
| EP | 0 193 635 | 9/1986 |
| EP | 0 394 098 | 10/1990 |
| EP | 0 545 532 | 6/1993 |
| EP | 0 569 593 | 11/1993 |
| EP | 0 662 674 | 7/1995 |
| EP | 0 671 741 | 9/1995 |
| EP | 0 710 955 | 5/1996 |
| EP | 0 756 274 | 1/1997 |
| EP | 0 809 245 | 11/1997 |
| JP | 61-286927 | 12/1986 |
| JP | 63-2130 | 1/1988 |
| JP | 63-7541 | 1/1988 |
| JP | 63-25791 | 2/1988 |
| JP | 63-25792 | 2/1988 |
| JP | 63-217569 | 9/1988 |
| JP | 1-127392 | 5/1989 |
| JP | 1-162286 | 6/1989 |
| JP | 1-263892 | 10/1989 |
| JP | 2-3132 | 1/1990 |
| JP | 2-5158 | 1/1990 |
| JP | 3-73481 | 3/1991 |
| JP | 4-304001 | 10/1992 |
| JP | 4-355818 | 12/1992 |
| JP | 4-356785 | 12/1992 |
| JP | 5-54460 | 3/1993 |
| JP | 5-258347 | 10/1993 |
| JP | 5-282771 | 10/1993 |
| JP | 6-139747 | 5/1994 |
| JP | 6-295200 | 10/1994 |
| JP | 7-334637 | 12/1995 |
| JP | 8-123635 | 5/1996 |
| JP | 8-161790 | 6/1996 |
| JP | 8-221945 | 8/1996 |
| JP | 9-34491 | 2/1997 |
| JP | 9-109803 | 4/1997 |
| JP | 9-126799 | 5/1997 |
| TW | 289190 | 10/1996 |
| TW | 374913 | 11/1999 |
| WO | WO94/29852 | 12/1994 |
| WO | 96/29699 | 9/1996 |

* cited by examiner

DISK STORAGE SYSTEM HAVING AN ELECTRONIC CIRCUIT MOUNTED ON THE SURFACE OF THE DISK AND CONTROL METHOD THEREOF

This application is a Continuation of U.S. patent application Ser. No. 09/837,348, filed on Apr. 18, 2001, now abandoned which is a continuation of Ser. No. 09/155785, filed on Oct. 2, 1998, now abandoned which is a 371 of PCT/JP98/02700, filed on 18 Jun. 1998.

TECHNICAL FIELD

The present invention relates to a method of controlling a rotary storage medium having an electronic circuit, and in particular, to a rotation control method for information transfer to the storage medium made by mounting an electronic circuit on an optical disk, and a system thereof.

BACKGROUND ART

A medium made by mounting an electronic circuit on an optical disk (hereinafter, this is called an intelligent disk (ID)) is known. In this case, in regard to the information transfer between the electronic circuit and an external apparatus, it is common to provide a connector nearby a rotary shaft of the disk or to connect via radio communication, optical communication, and the like, in consideration of a rotary disk.

Nevertheless, as an electronic circuit block of an ID has high-performance and the construction of the ID subjectively controlling an external apparatus becomes widespread, quantity and speed of the information transfer between the electronic circuit block and external apparatus restricts the performance of the entire system.

DISCLOSURE OF INVENTION

The present invention provides a control method of a rotary storage medium having an electronic circuit that resolves the conventional problems described above and controls connection between the electronic circuit block and external apparatus to enhance the performance of the entire system, and a system thereof.

In order to solve this task, the control method of a rotary storage medium of the present invention is a control method of a rotary storage medium, having in one-piece, an electronic circuit including at least a microprocessor. The method is characterized in that the rotary storage medium is rotated at the time of access to an information recording surface of the rotary storage medium, and that the rotary storage medium is stopped except the time of access to an information recording surface of the rotary storage medium to connect the electronic circuit to an external system. Here, access requests to the information-recording surface are queued, and if an access request essential to system operation occurs, these requests are executed in a batch mode. In addition, connection between the electronic circuit and external system a bus connection in is a contact type or a non-contact type.

Furthermore, a system of the present invention is an intelligent disk system including a storage medium that stores information and is detachable from a drive unit and that has double-surface recording structure. Moreover, the system is characterized in that the electronic circuit is mounted on at least one surface or between both surfaces of the storage medium. The electronic circuit is provided with at least a microprocessor. In addition, this system is characterized also in that this system has control means for controlling the storage medium so that contents of information recorded surfaces of the storage medium may be transferred to or loaded into an external apparatus at the time of the storage medium rotating or mechanically operating and the microprocessor may control the external apparatus at the time of the storage medium not operating.

The present invention can provide the control method of a rotary storage medium having the electronic circuit that controls connection between the electronic circuit block and external apparatus to enhance the performance of the entire system, and a system thereof.

BEST MODE FOR CARRYING OUT THE INVENTION

For detailed description of the present invention, an embodiment of the present invention will be described with reference to attached drawings.

(Constructive Example of Rotary Storage Medium of This Embodiment)

Figure 1:
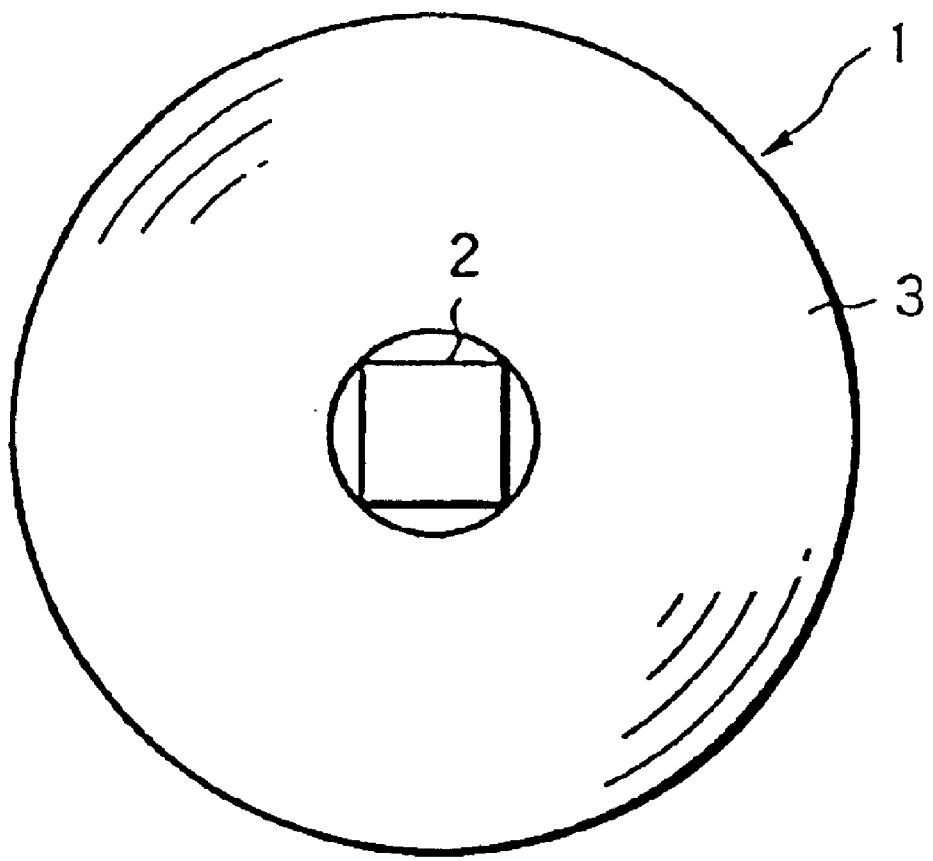
FIG. 1 is a sketch of an intelligent optical disk that is a kind of an ID of this embodiment.

FIG. 1 is a sketch of an intelligent optical disk that is a kind of an ID of this embodiment.

The ID 1 comprises a disk block 3 that is disk surfaces for storing information, and an intelligent circuit block 2 that is mounted, for example, in the central portion of the disk block 3 as shown in FIG. 1. Here, although the circuit block 2 is located in the central portion of the disk in FIG. 1, the location is not particularly limited, for example, it can also be located on a whole side of the disk surfaces or in a middle layer of a disk manufactured in plural layers.

Figure 2:
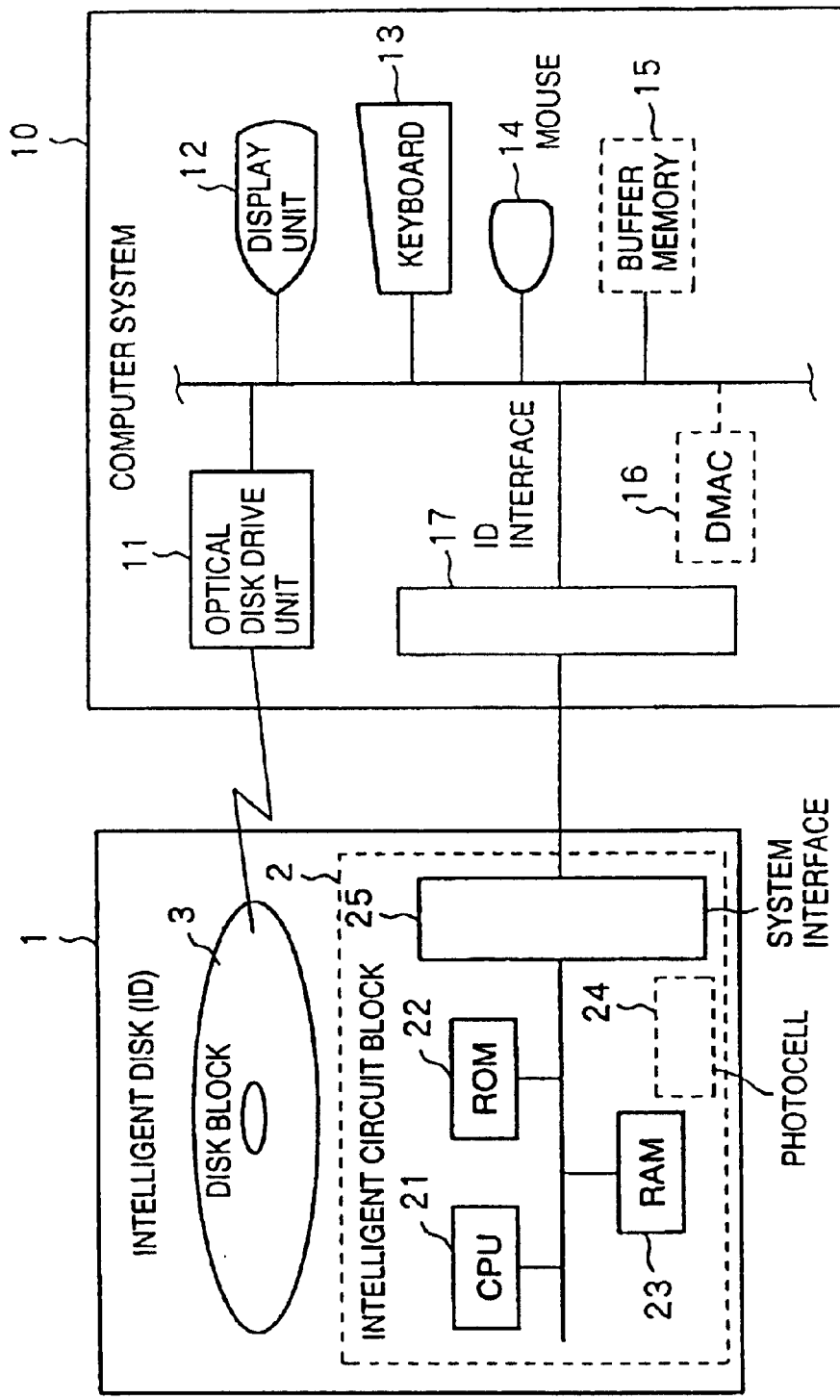
FIG. 2 is a diagram of the concept of the construction of the ID with associating with a computer system.

FIG. 2 is a diagram showing the concept of the construction of the ID 1 with associating with a computer system 10.

In the diagram, numeral 11 is an optical disk drive unit that is included in a computer system 10 and includes a pickup (not shown) reading (or writing) information on the disk block (surfaces) 3 of the ID and a pickup drive circuit (not shown) making the pickup seek on the disk surfaces. A display unit 12, a keyboard 13, and a mouse 14 are provided by connection to the optical disk drive unit 11 via a bus. Furthermore, it is preferable to provide a buffer memory 15 (composed of RAM and a hard disk) and a DMAC 16.

The intelligent circuit block 2 has ROM 22 for storing fixed programs, RAM 23 for temporary storage, and a CPU 21 for executing programs stored in the ROM 22 and RAM 23. Numeral 24 shows a photocell that is necessary if the ID has an independent power source.

The intelligent circuit block 2 exchanges information with an ID interface 17 of the computer system 10 via a system interface 25. A contact of the interface can be a contact type or a non-contact type, and a bus-connection type or a communication-connection type. Radio communication, optical communication, and the like are conceivable as the communication method. In addition, the system interface 25 and ID interface 17 can be omitted if the bus of the intelligent circuit block and the system bus are directly connected.

Figure 3:
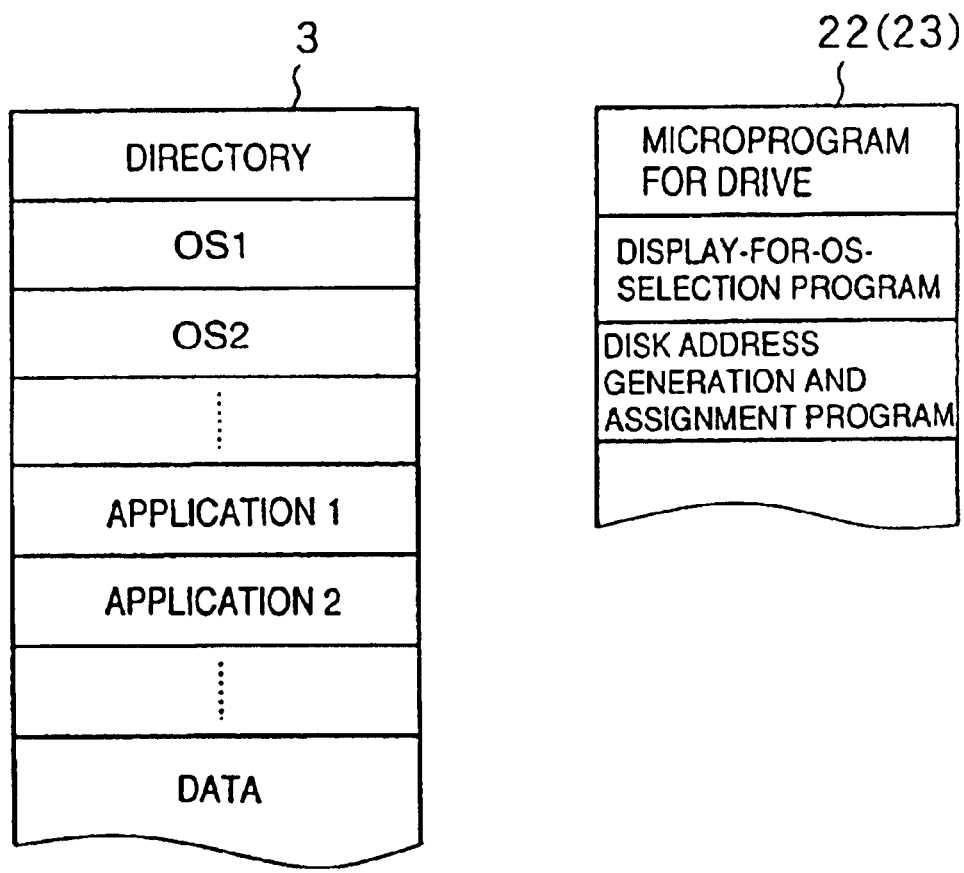
FIG. 3 is a drawing of an example of information stored in a disk block 3 and ROM 22 (or RAM 23)

FIG. 3 shows an example of information stored in a disk block 3 and ROM 22 (or RAM 23).

At positions of the disk block 3 that are pointed by a directory, a plurality of OSs (OS1, OS2, . . . ), a plurality of application programs (APP1, APP2, . . . ), and data are stored. In addition, the number of the OSs and application programs can be one.

Furthermore, in the ROM 22 (RAM 23), microprogram for the optical disk drive unit 11, a display-for-OS-selection program performing display of OS selection on the display unit 12, and a disk address generation and assignment program are stored. The disk address generation and assignment program generates readout addresses of the disk according to a selection command from the keyboard 13 or mouse 14, for example, the optical disk drive unit 11 and DMAC 16. In addition, if the copy of the directory of the disk block 3 is stored in the ROM 22 (RAM 23), readout from the disk becomes faster. Furthermore, the microprogram for the drive unit is a program for the optical disk drive unit 11 to be able to correspond by using different types of recording formats on the disk block 3. Therefore, a bootstrap program can take place of the microprogram if the recording formats are standardized.

(Example of Operational Procedure for System of This Embodiment)

Figure 4:
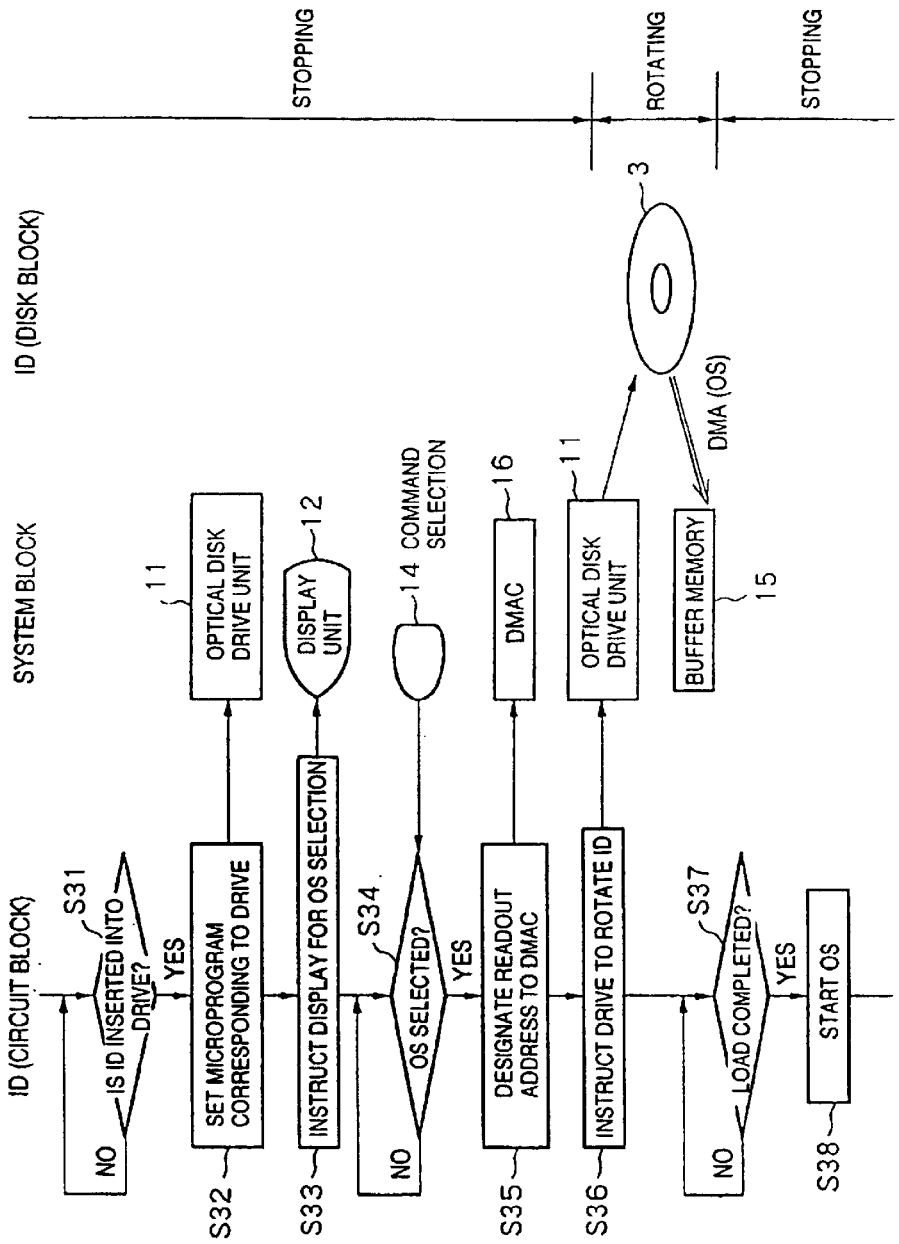
FIG. 4 is a chart of an example of operational procedure at the time of startup of this system.

FIG. 4 is a chart of an operation-procedural example at the time of startup in the above-described system. In addition, whether or not the ID 1 is rotating or stopped is indicated at the right.

First, at step S31, the circuit block 2 of the ID 1 checks whether the ID 1 is inserted into the drive. If inserted, the process goes to step S32 to load the microprogram corresponding to the recording format of the disk block 3 in the optical disk drive unit 11.

Next, at step S33, which OS is activated among the plurality of OSs stored on the disk block 3 is displayed on the display unit 12. At step S34, a selection command is waited, and if the selection command is issued with the mouse 14, the process goes to step S35 to set an address, where the desired OS according to the selection command is stored, and an address for writing into the buffer memory 15 in the DMAC 16. Furthermore, at step S36, the ID instructs the optical disk drive unit 11 to perform rotation/readout from the disk block 3.

The interface (bus connection) between the circuit block 2, upon ID starting rotation, and the external system 10 is released. If mutual information transfer is necessary, wireless communication can be used.

When rotating speed reaches a predetermined value, the information (OS) read from the disk block 3 is loaded to the buffer memory 15 by the DMAC 16 via the optical disk drive unit 11. When completion of the load is detected, the optical disk drive unit 11 stops the rotation of the ID 1 by a signal from the DMAC 16.

When completion of the load, that is, the stop of the rotation of the ID 1 is detected, the process goes from step S37 to step S38 to start the OS.

Therefore, since the ID 1 rotates only when loading the OS from the disk block 3 and stops otherwise, the circuit block 2 of the ID 1 and the system 10 are connected via the bus, and the CPU 21 can quickly control each peripheral in the system block 10 similarly to an ordinary computer system.

Figure 5:
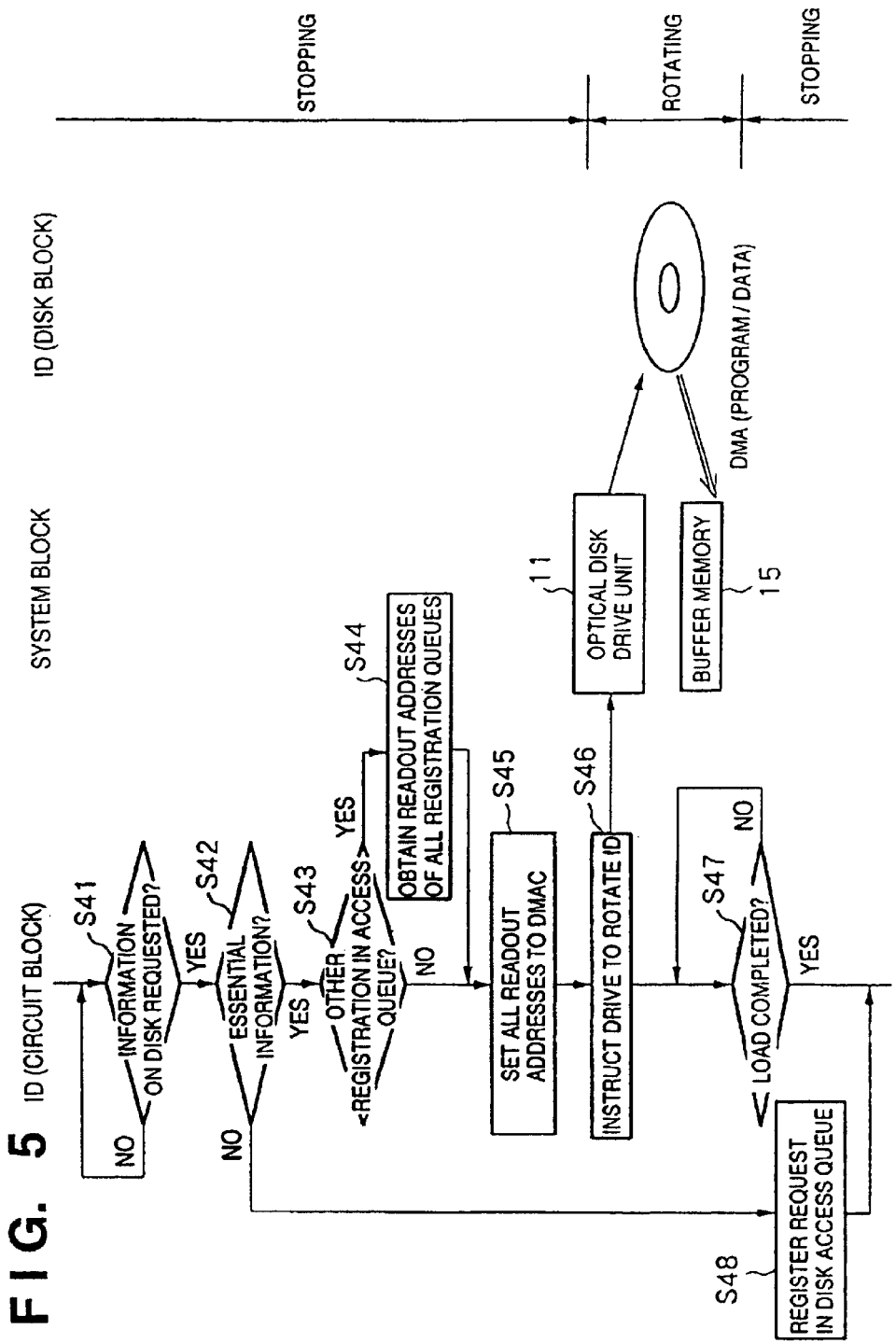
FIG. 5 is a chart of an example of a control procedure of access to the ID at the time of executing an OS or an application.

FIG. 5 is a chart shows an example of a control procedure of access of the ID at the time of executing an OS or an application.

First, the circuit block 2 of the ID 1 checks whether or not information on the disk block 3 is requested. In these requests, a change of an OS, a change of an application, a request for data access, and the like are included, and can be checked periodically or processed with interrupts.

If a request for information on the disk block 3 occurs, the process goes to step S42 to check whether or not the information is essential to operation of the entire system. This check is for enhancing the system performance by reducing the frequency of rotation/stop of the ID 1 by performing in batch mode to the responses of requests that are not urgent.

If not the essential information, the request is registered in a disk access queue at step S48, and the process exits from this flow.

If being the essential information, the circuit block 2 check at step S43 whether or not other members are registered in the disk access queue. If present, the circuit block 2 generates all the disk addresses and all the memory addresses at step S44 for continuous reading the contents of all the registered queues during one rotation period, and sets them at step S45 in the DMAC 16. For this reason, a plurality of addresses can be set in the DMAC 16.

At step S46, the circuit block 2 instructs the optical disk drive unit 11 to perform rotation/readout of the ID 1. All the registered queues and currently requested information is read from the disk block 3 sequentially into the buffer memory 15. When the readout of all the data is completed, the optical disk drive unit 11 stops the rotation of the ID 1 by a signal from the DMAC 16. The circuit block 2 waits until ID 1 stops, and when the stop is detected, the process exits from step S47 to return to the execution of the OS and the application.

In addition, since it is wasteful for the CPU 21 of the circuit block 2 to be idle during the rotation of the ID 1, it is possible to continue operation with the wireless communication as described above and to perform processing, which does not require the connection to the system side, by means of job management of the OS, during the rotation of the ID 1 (in this case, necessary data should be fetched into the RAM 23).

Furthermore, this example of operation is just one example, and the present invention includes various types of control that makes effective system operation possible by reducing the frequency of the rotation/stop of the ID.

Hereinbefore, the present invention is described with preferred embodiments. Nevertheless, the present invention is not limited to the above-described embodiments and various changes, additions, and modifications can be made within the spirits and scope as set out in the accompanying claims.

What is claimed is:

1. A control method for a system having a rotary storage medium and external parts, said rotary storage medium having a pair of layers, one of the pair of layers being used as an information recording portion and having a recordable or recorded surface, said recordable or recorded surface being structured to record essential information on the operation of the system, and another of the pair of layers being used as an electronic circuit portion and having electronic circuits including at least CPU and memory, the control method comprising:

rotating the rotary storage medium when accessing said essential information to the operation of the system on the recordable or recorded surface of said information recording portion of the rotary storage medium;

queuing access requests to said information recording surface and executing the queue requests in a batch mode when an access request essential to system operation occurs; and stopping the rotary storage medium except when accessing at least some of said essential information to the operation of the system, to connect between at least one of said electronic circuits and at least one of said external parts of the system and processing data including said essential information using said at least CPU and memory for control of the system.

2. The control method according to claim 1, wherein connection between said at least one of said electronic circuits and said at least one of said external parts of the system is a bus connection in a contact type or a non-contact type.

3. A control method for a system having a rotary storage medium and external parts, said rotary storage medium having an information recording portion and an electronic circuit portion including at least CPU and memory, the control method comprising:

rotating the rotary storage medium when accessing said essential information to the operation of the system on the information recording portion of the rotary storage medium;

queuing at least one access request to said information recording portion and executing the at least one queue request in a batch mode when an access request essential to system operation occurs; and stopping the rotary storage medium except when accessing said essential information for operation of the system, to connect between said electronic circuit and said external parts of the system and to process data including said essential information using said at least CPU and memory for control of the system.

4. The control method according to claim 1 wherein during rotation of the rotary storage medium, operation of the system continues through wireless communication between at least one of said electronic circuits and at least one of said external parts of the system.

5. The control method according to claim 3, wherein connection between at least one of said electronic circuits and at least one of said external parts of the system is a bus connection in a contact type or a non-contact type.

6. The control method according to claim 3 wherein during rotation of the rotary storage medium, operation of the system continues through wireless communication between at least one of said electronic circuits and at least one of said external parts of the system.

* * * * *